United States Patent
Zanella et al.

(10) Patent No.: US 11,794,337 B2
(45) Date of Patent: Oct. 24, 2023

(54) GRIPPING DEVICE FOR HANDLING ITEMS OR COMPONENTS OF DIFFERENT SHAPE AND SIZE

(71) Applicant: C.R.F. Società Consortile per Azioni, Orbassano (IT)

(72) Inventors: Alessandro Zanella, Orbassano (IT); Michal Jilich, Genoa (IT); Giorgio Pietronave, Genoa (IT); Matteo Zoppi, Genoa (IT)

(73) Assignee: C.R.F. SOCIETA CONSORTILE PER AZIONI, Orbassano (IT)

( * ) Notice: Subject to any disclaimer, the term of this patent is extended or adjusted under 35 U.S.C. 154(b) by 309 days.

(21) Appl. No.: 17/186,060

(22) Filed: Feb. 26, 2021

(65) Prior Publication Data
US 2021/0323143 A1    Oct. 21, 2021

(30) Foreign Application Priority Data

Apr. 20, 2020    (EP) .................................... 20170332

(51) Int. Cl.
*B25J 9/10*    (2006.01)
*B25J 15/00*    (2006.01)
(Continued)

(52) U.S. Cl.
CPC ............... *B25J 9/109* (2013.01); *B25J 9/104* (2013.01); *B25J 9/1075* (2013.01);
(Continued)

(58) Field of Classification Search
CPC ...... B25J 9/104; B25J 9/1065; B25J 15/0009; B25J 15/0028; B25J 15/022;
(Continued)

(56) References Cited

U.S. PATENT DOCUMENTS 2,545,452 A * 3/1951 Fletcher .................. A61F 2/586
  623/64
4,351,553 A * 9/1982 Rovetta ................ B25J 15/0009
  294/111

(Continued)

FOREIGN PATENT DOCUMENTS

CN    10102487 A    8/2007
CN    101829994 A    9/2010
(Continued)

OTHER PUBLICATIONS

European Search Report dated Sep. 29, 2020.

*Primary Examiner* — Dean J Kramer
(74) *Attorney, Agent, or Firm* — Heslin Rothenberg Farley & Mesiti P.C.; Victor A. Cardona, Esq.

(57) ABSTRACT

A gripping device has at least one tendon associated with a gripping arm and guided in a freely slidable manner along a first and second arm portion thereof through a succession of guiding elements. The guiding elements associated with a first proximal arm portion of the arms are carried by an inner yielding panel so that when the inner yielding panel on the inner side of the first proximal arm portion engages against an item or component to be gripped, the guiding elements of the tendon carried by the inner yielding panel cause a tensioning of the tendon, which results in an articulation and/or inflection movement of a second distal arm portion with respect to the first proximal arm portion.

11 Claims, 12 Drawing Sheets

(51) Int. Cl.
*B25J 15/02* (2006.01)
*B25J 15/10* (2006.01)
(52) U.S. Cl.
CPC ......... *B25J 15/0009* (2013.01); *B25J 15/024* (2013.01); *B25J 15/103* (2013.01)
(58) Field of Classification Search
CPC ...... B25J 15/0233; B25J 15/024; B25J 15/10; B25J 15/103; B25J 15/12
USPC ........................................................ 294/111
See application file for complete search history.

(56) References Cited

U.S. PATENT DOCUMENTS

| | | | | |
|---|---|---|---|---|
| 5,762,390 | A * | 6/1998 | Gosselin | B25J 15/103 901/33 |
| 9,643,323 | B2 * | 5/2017 | Nagatsuka | B25J 15/0009 |
| 9,914,214 | B1 * | 3/2018 | Strauss | B25J 15/0206 |
| 9,925,672 | B2 * | 3/2018 | Nakayama | B25J 19/023 |
| 2019/0152068 | A1 * | 5/2019 | Kondo | B25J 9/1065 |

FOREIGN PATENT DOCUMENTS

| | | |
|---|---|---|
| CN | 110053036 A | 7/2019 |
| WO | 2019236580 A1 | 12/2019 |

* cited by examiner

GRIPPING DEVICE FOR HANDLING ITEMS OR COMPONENTS OF DIFFERENT SHAPE AND SIZE

CROSS REFERENCE TO RELATED APPLICATIONS

This application claims priority from European Patent Application No. 20170332.9 filed on Apr. 20 2020, the entire disclosure of which is incorporated herein by reference.

FIELD OF THE INVENTION

The present invention relates to gripping devices, or "grippers", of the type usable, for example, on a robot, for handling items or components in an industrial environment.

In particular, the invention relates to a gripping device applicable in an industrial assembly line for picking up items or components from a container in which these items or components are stored for being transferred to a position where they can be used by an operator or robot for mounting along the assembly line.

PRIOR ART

Industrial grippers which have a dedicated configuration, i.e. designed according to the shape and size of the items that the gripper must grasp, have been known and used for a long time.

Grippers having a certain extent of operational flexibility, which allows them to be used for handling items or components of different shape and/or different size, have also been proposed. However, all solutions of this type have proved to be relatively complex and unreliable.

In the case of some specific applications (for example in the assembly lines of engine units for motor-vehicles), the items or components that make up a specific assembly kit can vary considerably both in shape and in size. Therefore, there is a need for a gripper capable of automatically adapting to these differences, guaranteeing—in any case—the stability of the grip, without requiring the adoption of excessively complex structures, also with reference to the gripper control systems.

OBJECT OF THE INVENTION

The object of the invention is, therefore, to provide a gripping device that has high operating flexibility, in the sense of an ability to automatically adapt to items and components to be gripped having shapes and sizes also very different from each other, and which, nevertheless, is reliable in operation and does not require a complex control system.

SUMMARY OF THE INVENTION

In view of achieving the abovementioned objective, the invention relates to a gripping device, usable for example on a robot, for handling items or components of variable shape and size, said device comprising:
  a support structure,
  a plurality of gripping arms, each including a first proximal arm portion pivotally connected to the support structure and at least one second distal arm portion connected to the first proximal arm portion,
  a plurality of actuator devices carried by the support structure and each associated with a respective gripping arm, for commanding an articulation movement of said first proximal arm portion with respect to the support structure,
  at least one tendon associated with each gripping arm and having a first and a second head end secured to the first proximal arm portion and to the second distal arm portion respectively,
  each tendon being guided in a freely slidable manner along said first and second arm portions through a succession of guiding elements associated with said first and second arm portions,
  wherein the guiding elements associated with the first proximal arm portion are carried by an inner yielding panel arranged on an inner side of said first arm portion, which faces the item or component to be gripped,
  so that when the inner yielding panel on the inner side of the first proximal arm portion engages against an item or component to be gripped following a command given by the respective actuator device, the guiding elements of the tendon carried by the inner yielding panel cause a tensioning of the tendon which results in an articulation and/or inflection movement of said second distal arm portion with respect to the first proximal arm portion,
  so that each gripping arm is able to automatically adapt to the configuration of the item or component to be gripped, independently of the other gripping arms.

Thanks to the aforesaid characteristics, the gripping device according to the invention has a high operational flexibility in terms of its ability to automatically adapt to items or components of even very different shape and size.

In a preferred embodiment, the inner yielding panel comprises a first surface facing the item or component to be gripped, and a second surface, opposite the first surface, on which the guiding elements are carried. Preferably, two tendons substantially parallel to each other are associated with each actuator arm is associated with, and wherein said tendons are guided in a freely slidable manner through a succession of holes formed through said guiding elements.

In a first example of this embodiment, the second distal portion of each arm comprises a back member in the form of a chain of mutually articulated elements, on which the guiding elements that are associated with the second distal arm portion are carried, and an inner element, facing the item or component to be gripped, and wherein the inner element comprises a flexible auxiliary panel, having a first end and a second end, kept substantially parallel and distanced with respect to the back member by a plurality of connecting elements.

In a second example of this embodiment, the second distal portion of each arm comprises a back member in the form of a first chain of mutually articulated elements, on which the guiding elements are carried, and an inner element, facing the item or component to be gripped, and wherein the inner element is in the form of a second chain of mutually articulated elements, having a first end and a second end, kept substantially parallel and distanced with respect to the back member by a plurality of connecting elements.

In the aforesaid preferred embodiment, each gripping arm further comprises a third distal portion, connected to the second distal portion. The second end of the inner element is connected to said third distal portion, so that the aforesaid tensioning condition of the tendon also results into an articulation and/or inflection movement of the third distal arm portion with respect to the second distal arm portion, so as to further improve the adaptation of each gripping arm to the item or component to be gripped.

Still preferably, the first proximal arm portion has an articulated quadrilateral configuration defined by two pairs of arms each articulated at one end to said support structure and at the opposite end to an intermediate connecting member between the first proximal arm portion and the second distal arm portion. In this preferred embodiment, the actuator device associated with each gripping arm is a fluid actuator cylinder having opposite ends connected, respectively, to the support structure and to said intermediate member by means of connecting kinematic mechanisms configured so that a variation in length of the actuator cylinder produces an oscillation of the first proximal arm portion with respect to said support structure.

The aforesaid inner yielding panel of the first proximal portion of each gripping arm can, for example, be in the form of a flexible panel or of a chain of mutually articulated elements.

DESCRIPTION OF A PREFERRED EMBODIMENT

Further characteristics and advantages of the invention will become apparent from the description that follows with reference to the attached drawings, provided purely by way of non-limiting example, wherein.

Figure 1:
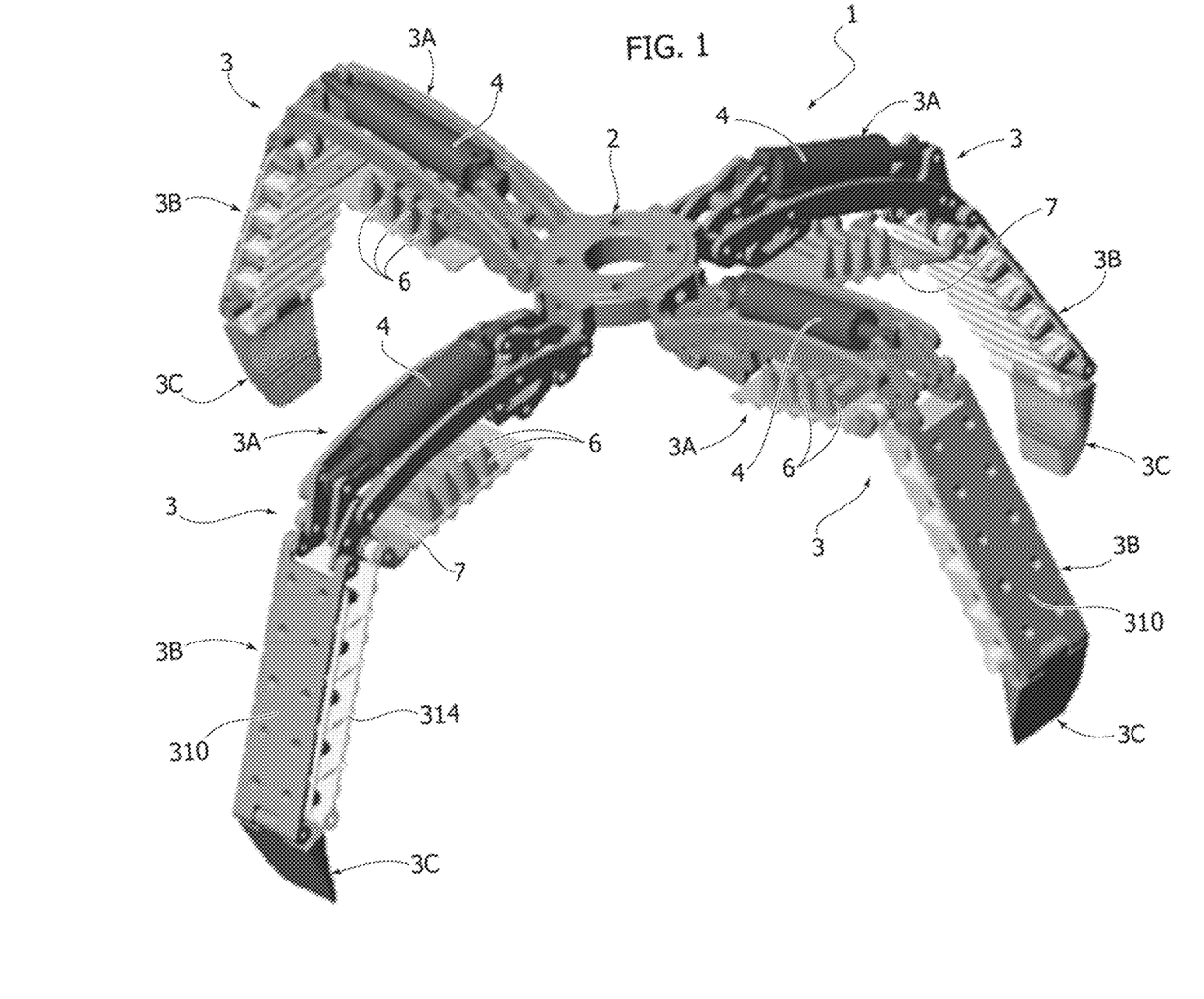
FIG. 1 is a perspective view of a first example of a preferred embodiment of the gripping device according to the invention.

With reference to FIG. 1, numeral 1 indicates—in its entirety—a first example of a preferred embodiment of a gripping device, usable for example on a robot, for handling items or components of variable shape and size. The device 1 can be used, for example, for handling items or components intended to be used in an industrial line for assembling motor-vehicle engine units. It is evident, however, that the gripping device according to the invention is of general application and is particularly indicated in all applications where it is necessary that the gripping device is capable of automatically adapting to items or components of shapes and sizes that are even greatly different from each other. Furthermore, although the device illustrated here is in particular intended to be used as an end effector on a handling robot, its application on any other type of machine or handling device is not excluded.

As shown in FIG. 1, the gripping device 1 comprises a support structure 2 and a plurality of gripping arms 3. According to the invention, it is sufficient that the gripping arms 3 are at least two. In the illustrated example, the gripping arms 3 are four in number.

In the illustrated case, the support structure 2 is in the form of an annular plate provided with holes for the engagement of fastening screws to a flange (not illustrated) carried by the wrist of a robot on which the device 1 must be mounted. The gripping arms 3 extend starting from the annular plate 2 in radial directions equally angularly distanced from each other.

Each gripping arm 3 comprises a first proximal portion 3A, a second distal portion 3B and a third distal portion 3C. The first proximal portion 3A of each gripping arm 3 is pivotally connected to the annular plate 2. The second distal portion 3B is pivotally connected to the first proximal portion 3A. The third distal portion 3C is connected to the second distal portion 3B.

Figure 5:
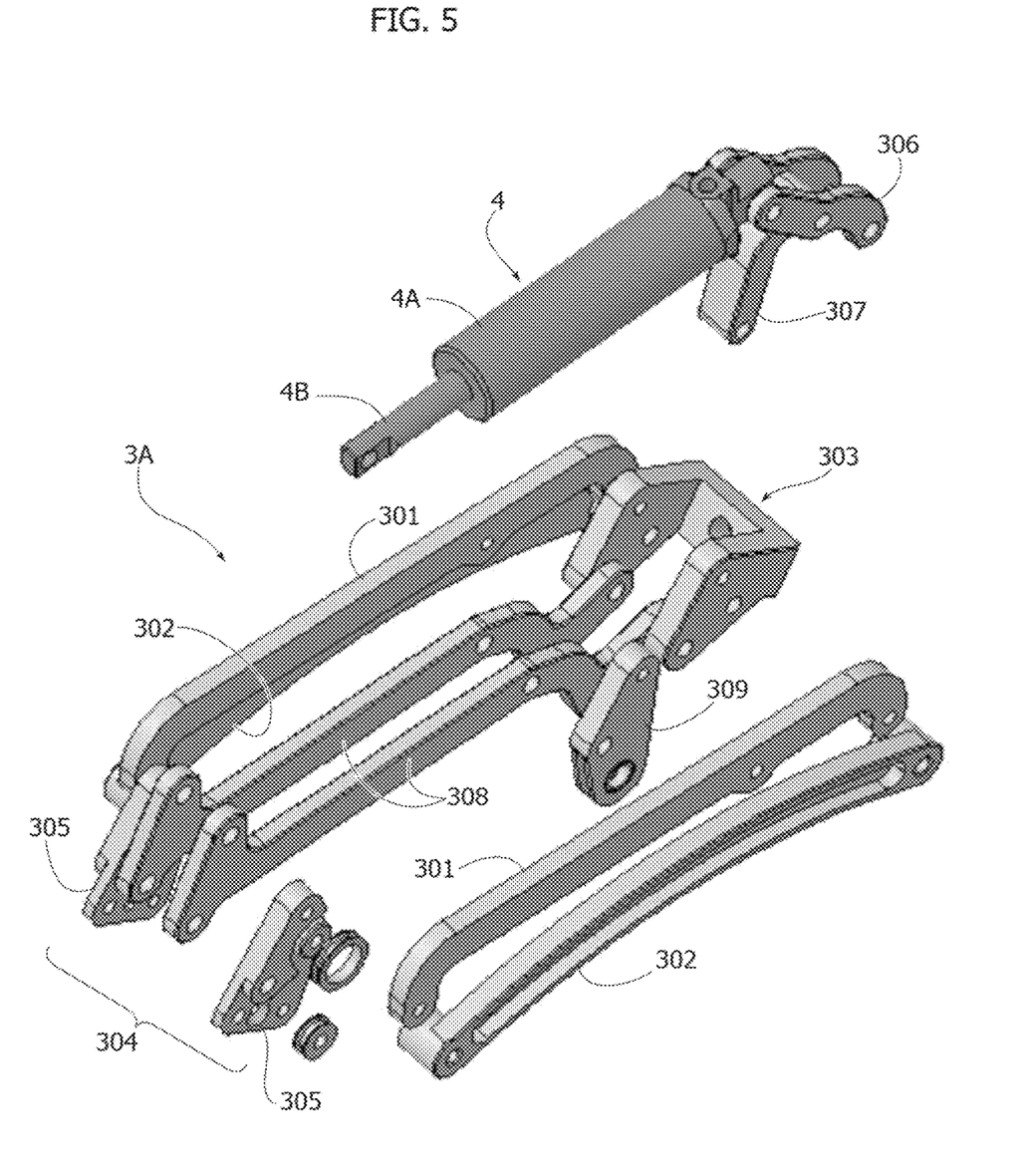
FIG. 5 is an exploded perspective view of a part of the gripping arm of FIG. 3.

With reference to the illustrated example (see FIGS. 3, 3A-3E and 5), the first proximal portion 3A has an articulated quadrilateral configuration defined by two pairs of arms 301, 302. With reference in particular to FIG. 5, each arm 301, 302 has an end articulated to a bracket 303. The bracket 303 has a fork shape with a central part rigidly connected to a corresponding side face of the annular plate 2, and two wings to which the two pairs of arms 301 and 302 are articulated.

On the opposite side to the bracket 303, each arm 301, 302 is articulated to a connecting member 304, intermediate between the first portion 3A and the second portion 3B, which—in the illustrated example—comprises two parallel and distanced plates 305 which are rigidly connected together.

As can be seen in FIG. 1, respective actuator devices 4 are associated with the gripping arms 3, provided for commanding an articulation movement of the first portion 3A with respect to the annular plate 2. As visible in FIG. 5, each actuator device 4 is a fluid actuator cylinder (preferably a hydraulic cylinder) comprising a cylindrical body 4A and a sliding rod 4B.

The present description and the attached drawings do not show the power supply circuit of the actuator devices 4, which can be implemented in any known way. Typically, this circuit includes solenoid valves for distributing fluid under pressure to the actuator cylinders. Furthermore, again according to the conventional technique in this field, the system comprises an electronic controller which controls the aforesaid solenoid valves according to the commands given by an operator, or automatically generated on the basis of a predetermined program. The constructive details relating to these components have been omitted as they can be made in any known way, and because these details, taken on their own, are not the subject of the present invention, and finally as their elimination from the drawings makes them simpler and easier to understand.

Figure 6:
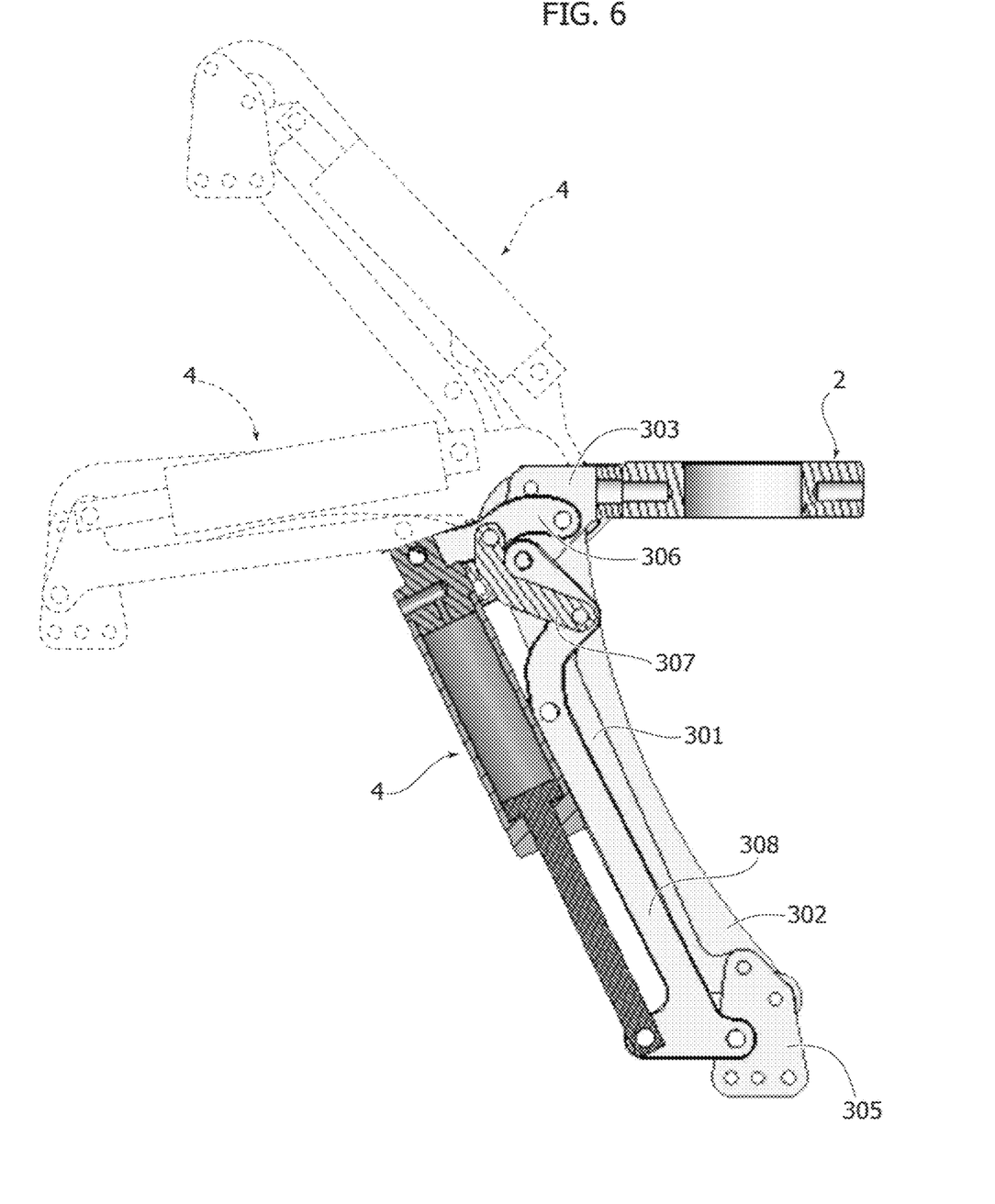
FIG. 6 is a lateral view of the part shown in FIG. 5 in three different operating conditions.

With reference again to FIG. 5 and FIG. 6, each actuator cylinder 4 has opposite ends connected, respectively, to the annular plate 2 and to the plates 305 by means of connecting kinematic mechanisms (articulated arms 306, 307, 308, 309) configured so that a variation in length of the actuator cylinder 4 produces an oscillation of the first portion 3A with respect to the annular plate 2. In the illustrated example, the aforesaid kinematic mechanisms correspond to the so-called Hoeken kinematic mechanism (known in the art), and have the advantage of allowing each actuator cylinder 4 to be arranged in a position parallel and adjacent to the respective arm portion 3A, so as to keep the overall dimensions of the assembly consisting of each portion 3A and of the relative actuator cylinder 4 reduced. However, for the purposes of the present invention, the arrangement and the configuration of the connecting kinematic mechanism between the actuator cylinder 4 and the arm portion 3A controlled thereby can be of any type.

Figure 3:
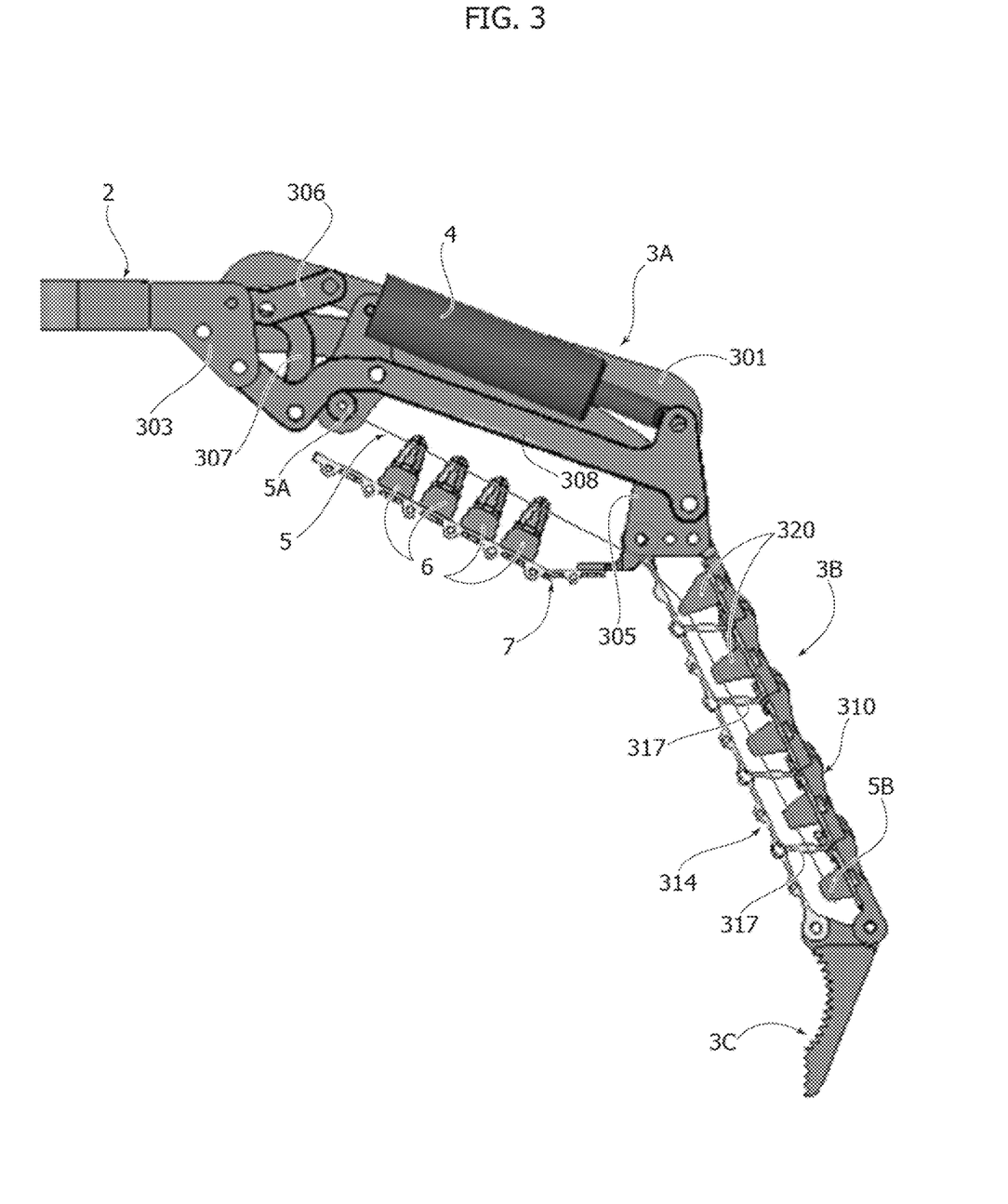
FIG. 3 is a side view of one of the gripping arms of the gripping device of FIG. 1 in a first operating condition.
Figure 4:
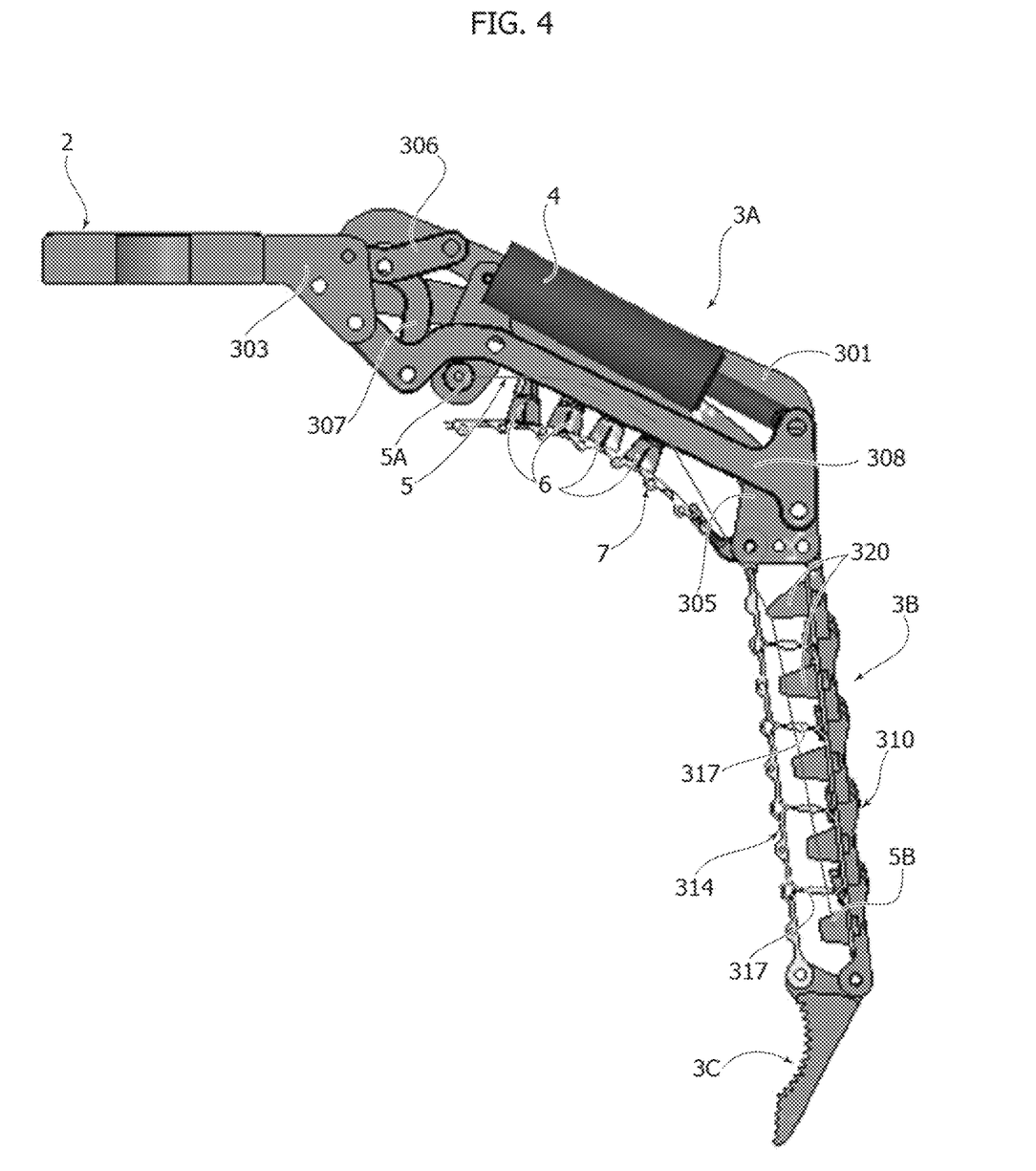
FIG. 4 is a lateral view of the gripping arm of FIG. 3 in a second operating condition.

With particular reference to FIGS. 3 and 4, one or more tendons 5 are associated with each gripping arm 3 of the device 1 (in the illustrated example two tendons are provided, substantially parallel and distanced from each other). Each tendon 5 has a first head end 5A associated with the first portion 3A and a second head end 5B associated with the second portion 3B. In the example illustrated in FIGS. 3 and 4, the head 5A of each tendon 5 is connected to the element 309 of the kinematic mechanism associated with the actuator cylinder 4, while the second head 5B is connected to the structure of the second portion 3B, which will be described in detail below.

Figures 3A, 3B:
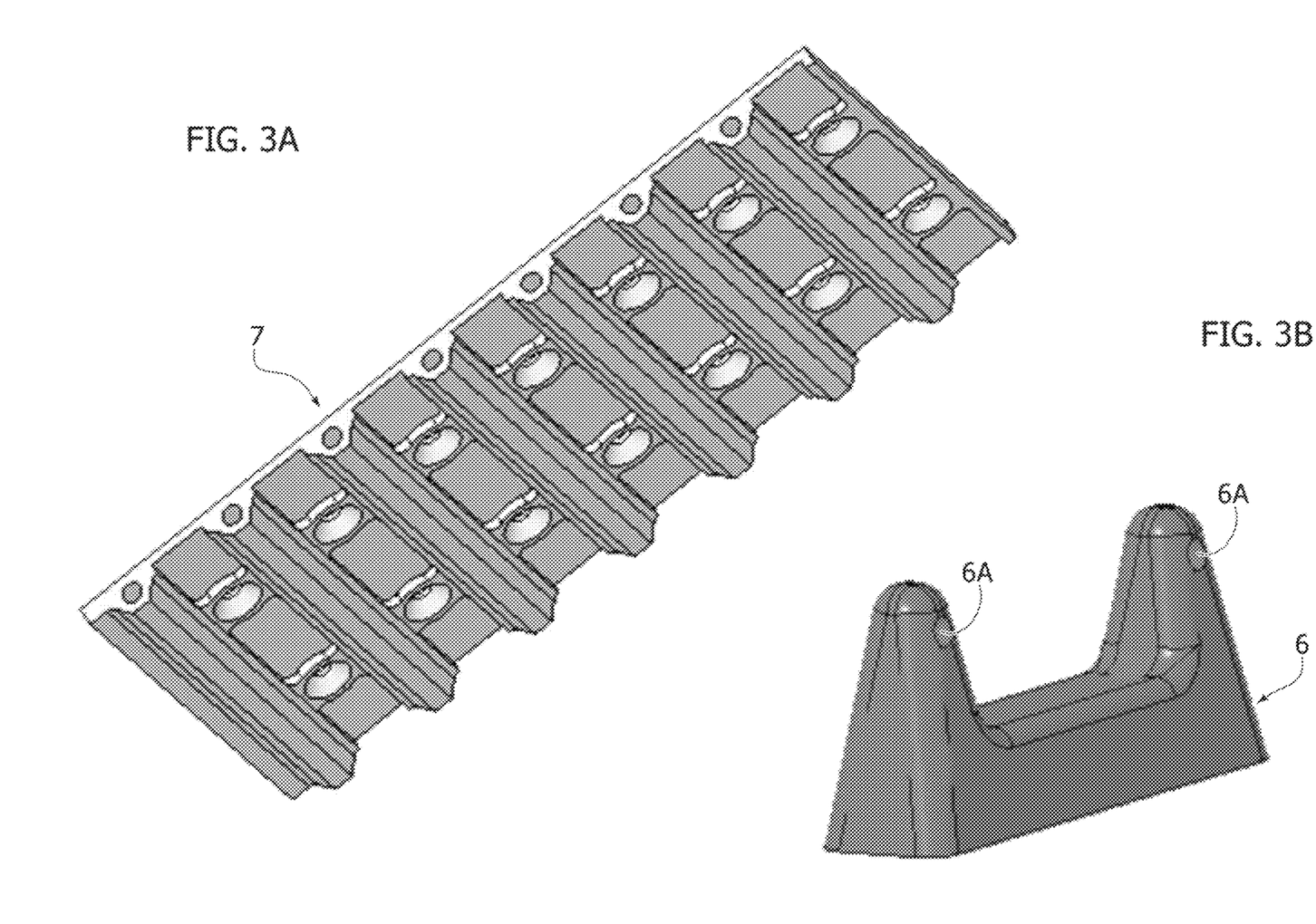
FIGS. 3A-3E are perspective views of details of the gripping arm of FIG. 3.

The two tendons 5 are engaged in a freely slidable manner by means of through-holes 6A (see also FIG. 3B) formed in a succession of guiding elements 6 carried by a flexible panel of plastic material 7 (see also FIG. 3A). With reference to FIGS. 3 and 4, the panel 7 is supported in a cantilevered fashion by the plates 305 on the inner side of the arm 3, facing the item or component to be gripped. The flexible panel 7 has one end connected to the plates 305, and the opposite end is free and constitutes a yielding element capable of moving in the direction of the portion 3A of the arm 3 following engagement with the gripped item or component. The guiding elements 6 are mounted on the surface of the panel 7 opposite the surface facing the item or component to be gripped.

FIG. 4 shows, in particular, the configuration assumed by the panel 7 following engagement with the gripped item or component (not shown). As can be seen, when the panel 7 yields as a result of this engagement, it pushes the guiding elements 6 so as to cause a tensioning of the tendons 5, which causes an oscillation or buckle of the second portion 3B with respect to the first portion 3A.

Therefore, while the oscillation movements of the first portion 3A are positively controlled by the respective actuator cylinder 4, the movements of the second portion 3B are an automatic consequence of the movements of the first portion 3A and are not controlled by a further actuator, so that each of the aforesaid arms 3 falls into the category of so-called "under-actuated" handling arms.

Figure 3C:
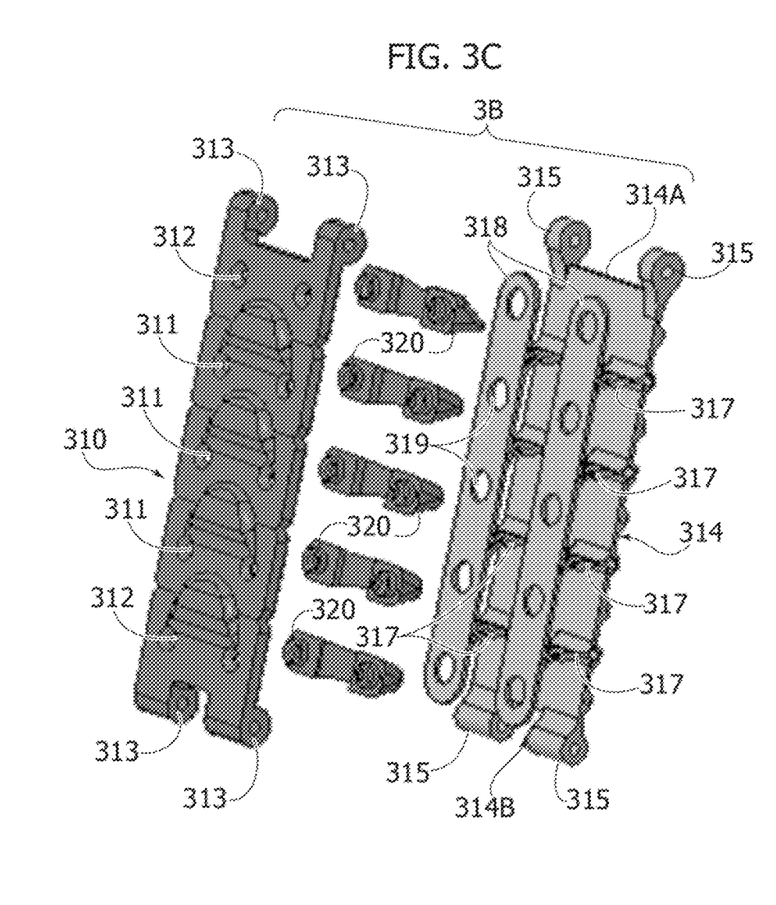
Figure 3D:
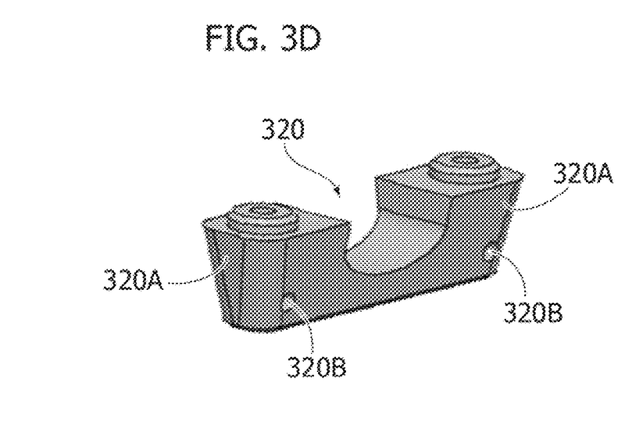
Figure 3E:
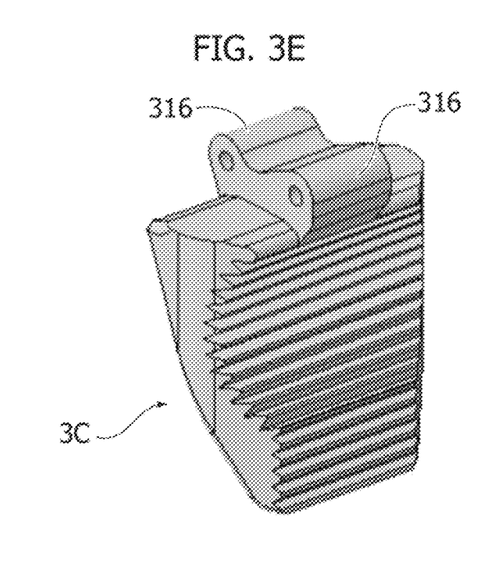

With reference to FIGS. 3, 3C and 4, the second distal portion 3B of each arm 3 comprises a back member 310 in the form of a chain of mutually articulated elements 311, 312. The end elements of this chain, indicated with 312, have hinge bushings 313 for the pivotal connection to the plates 305 (constituting the intermediate connecting member 304 between the first portion 3A and the second portion 3B) and to the third distal portion 3C (visible in perspective view in FIG. 3E).

The second distal portion 3B further comprises an inner element, facing the item or component to be gripped. The inner element includes a flexible auxiliary panel 314, having a first end 314A and a second end 314B, each of which has two hinge bushings 315 for the pivotal connection to the intermediate connecting member 304 and to the third distal portion 3C. As visible in FIG. 3E, the distal portion 3C has two perforated appendages 316 for the engagement of the articulation pins to the bushings 313 and 315.

The flexible auxiliary panel 314 is kept substantially parallel and distanced from the back member 310 by a plurality of connecting elements 317. In a preferred embodiment, the connecting elements 317 are in the form of sheet elements formed in a single piece both with the panel 314 and with two strips 318 which have holes 319 for engaging fastening screws to the elements 311, 312 of the back member 310.

A plurality of guiding elements 320 are also associated with the second distal portion 3B (see also FIG. 3D), provided for guiding the tendons 5. The guiding elements 320 are fixed to the elements 311, 312 of the back member 310 by means of the same fastening screws of the strips 318 of the flexible auxiliary panel 314. In a preferred embodiment, the guiding elements 320 have a bridge shape, with two lateral portions 320A bearing the holes for the fastening screws and two additional through-holes 320B, oriented orthogonally with respect to the screw holes, through which the tendons 5 are engaged.

The operation of the gripping device 1 described above is as follows.

The gripping device 1 visible in FIG. 1 can be mounted on a robot of any type for picking up, handling and depositing items or components of various shapes and sizes.

Figure 2:
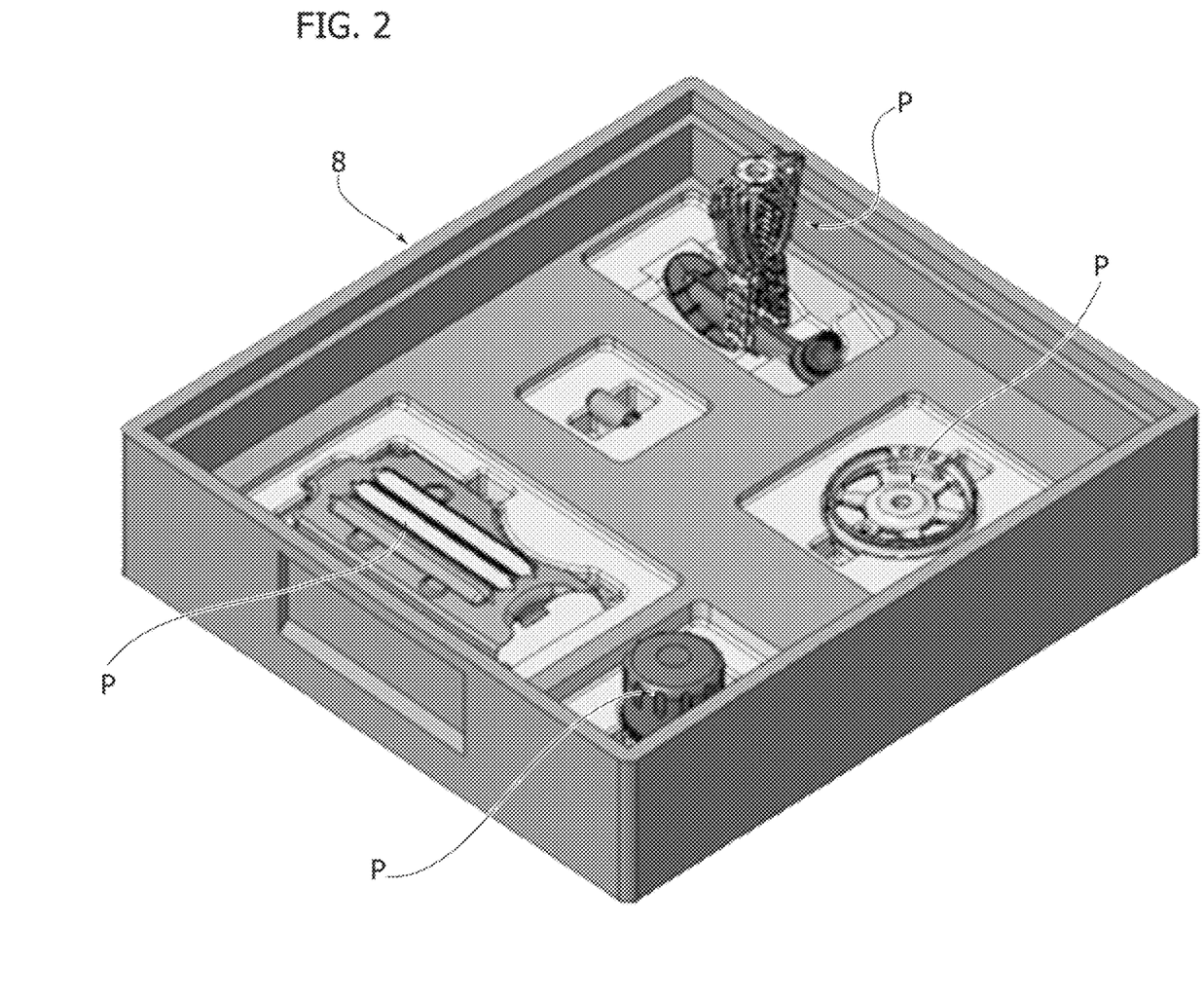
FIG. 2 is a perspective view of an example of a container carrying a kit of items or components intended to be handled by means of the gripping device of FIG. 1 for their use in an industrial line for assembling motor-vehicle engine units.

For example, the device 1 can be used by a robot that prepares kits of items and components to be assembled in an assembly line of engine units. FIG. 2 shows an example of a container 8 containing items or components P, which must be picked up and carried to a position provided for the assembly along the line by a manual operator or an automated device.

With reference to FIGS. 1, 4 and 5, when the gripping device 1 must grip an item P, it is positioned with the gripping arms 3 in the open position illustrated in FIG. 1. Starting from this position, activation of the actuator cylinders 4 causes an oscillation of the first portions 3A with respect to the annular plate 2 carried by the robot. The arms 3 thus approach the item P to be picked up until an engagement of the flexible panel 7 of each arm 3. Following this engagement, the flexible panel 7 assumes, for example, the arched conformation visible in FIG. 4, or in any case deforms elastically so as to bring the guiding elements 6 of the first proximal portion 3A to create tension in the tendons 5. As already indicated above, the tensioning of the tendons 5 causes the oscillation of the second distal portion 3B towards the item P to be gripped. As visible in FIG. 4, following the further oscillation of the portion 3B, the auxiliary flexible panel 314 in turn causes an oscillation of the third distal portion 3C.

Figure 14:
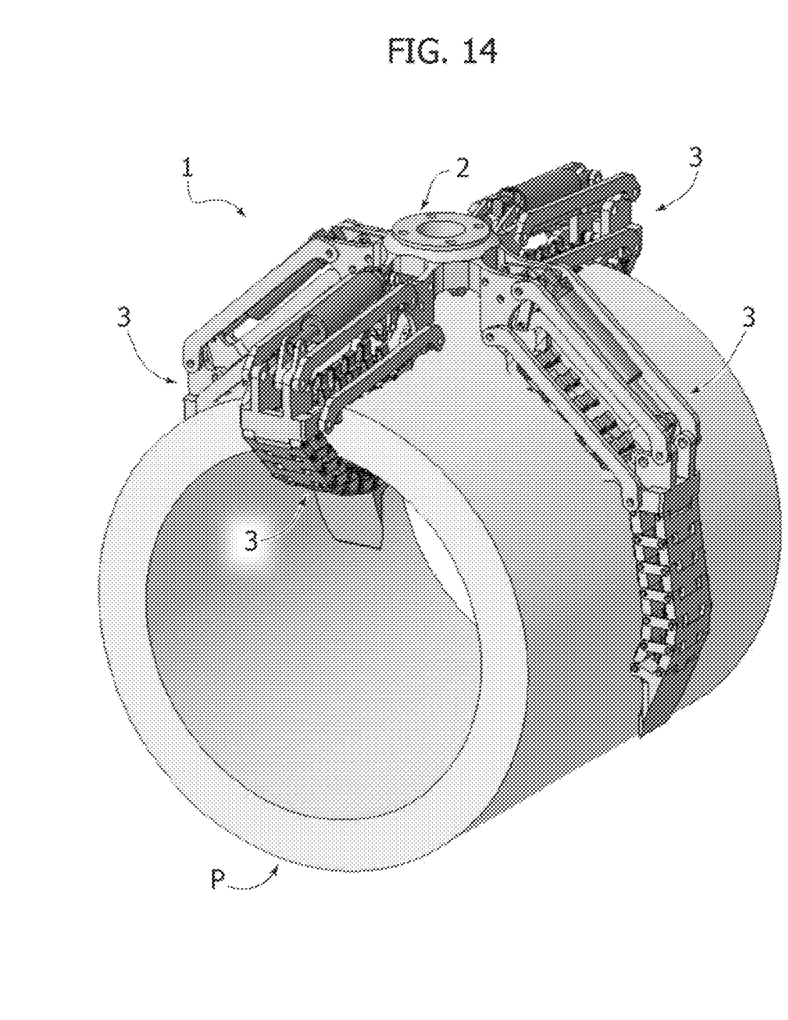
Figure 15:
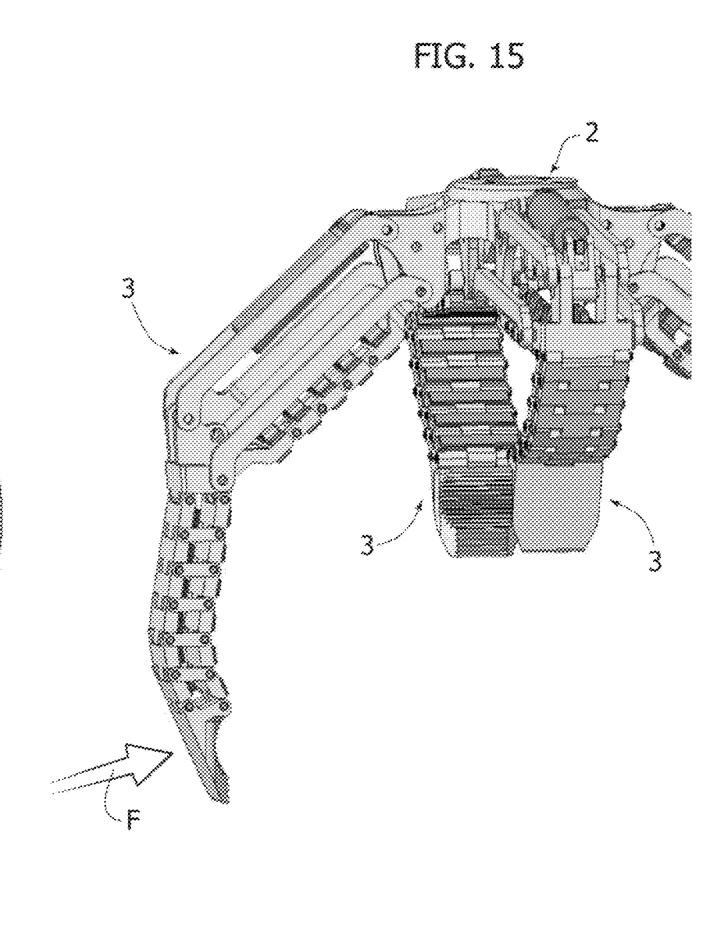
FIG. 15 is a partial perspective view of the gripping device shown in FIG. 7.

FIGS. 9, 10, 11, 12 and 13 show, with reference to a second embodiment which will be described hereinafter, the gripping condition of items P of different shapes and sizes following the maneuver described above. Still with reference to FIG. 14, an important advantage of the present invention consists in the fact that each of the arms 3 of the gripping device 1 is arranged each time, following activation of the actuator cylinders 4, in a gripping configuration which is independent of the one assumed by the other gripping arms 3. With reference also to FIG. 15, during the movements of the gripping device 1 in the absence of an item P picked up between the arms 3, each arm 3 is able to elastically yield if it is subjected to a force F from the outside, for example following an accidental impact with a foreign body, which makes the device according to the invention also suitable for being used with collaborative robots, namely robots that work alongside the operators, and not in fenced areas, from which the operators are excluded.

Figure 7:
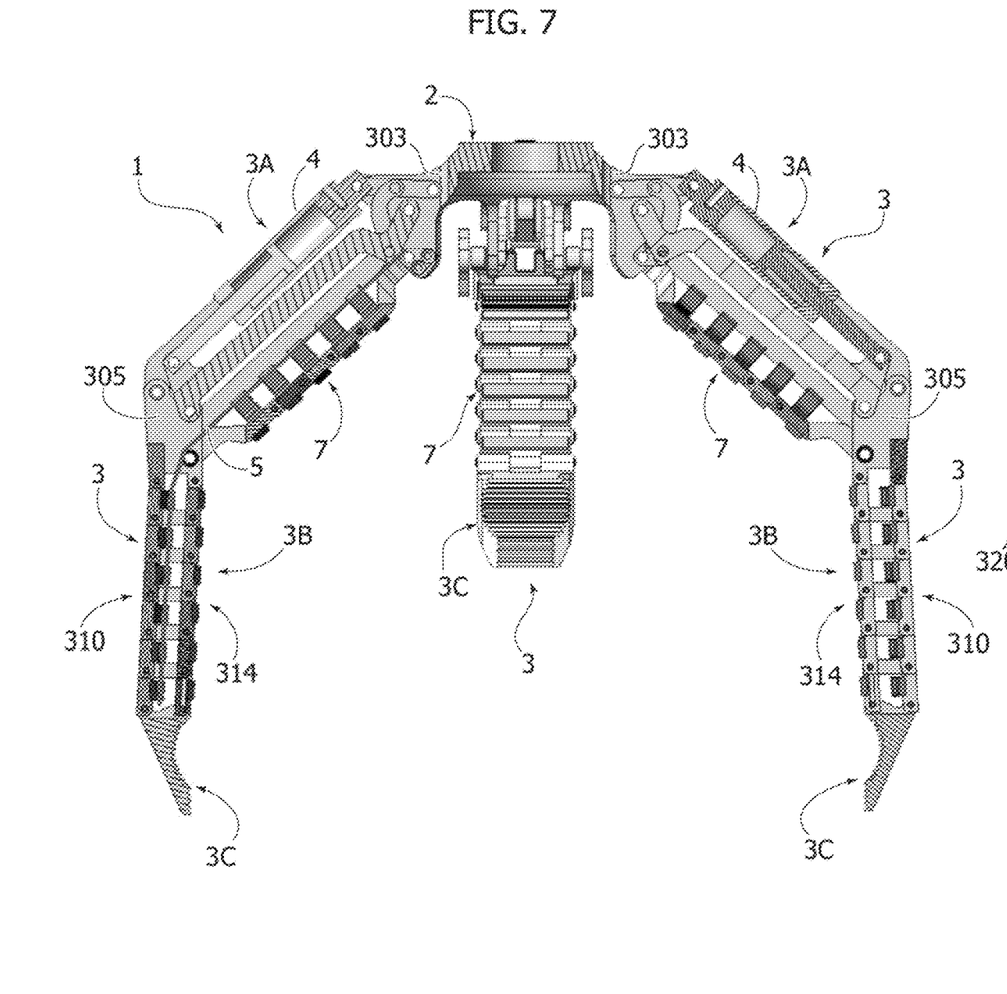
FIG. 7 is a lateral view of a second example of a preferred embodiment of the gripping device according to the invention.
Figure 8:
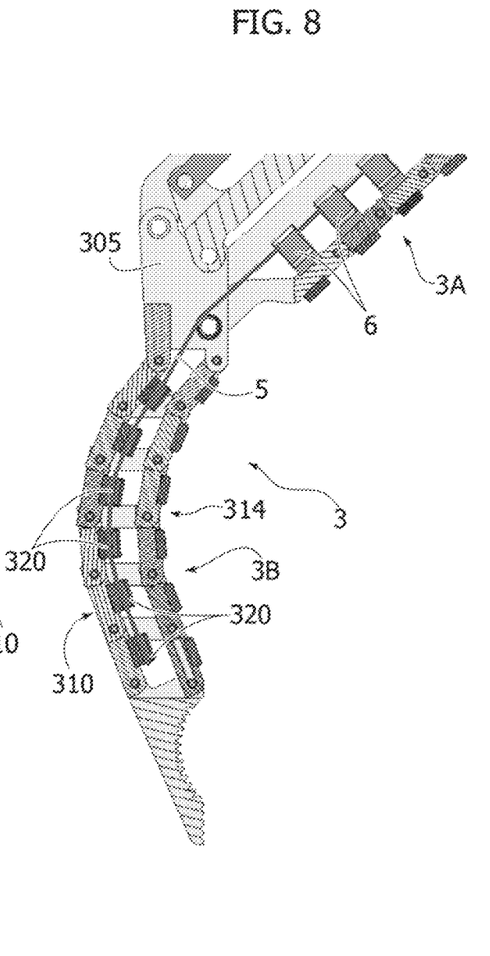
FIG. 8 is a lateral view of one of the gripping arms of the gripping device of FIG. 7 in a different operating condition.

FIGS. 7, 8 illustrate a second example of the preferred embodiment. In these figures, the parts that are the same or corresponding to those of FIGS. 1-6 are indicated by the same reference numbers. The main difference with respect to the first example described above lies in the fact that, in this case, both the flexible panel 7 on the inner side of the first proximal portion 3A of each arm 3, and the flexible auxiliary panel 314 of the second distal portion 3B of each arm 3 consist of chains of mutually articulated elements. With reference to FIG. 8, the back member 310 comprises elements directly connected to each other by means of articulation pins and carrying the guiding elements 320.

The operation of the second example of the preferred embodiment is completely similar to that described above with reference to the first example.

Figure 9:
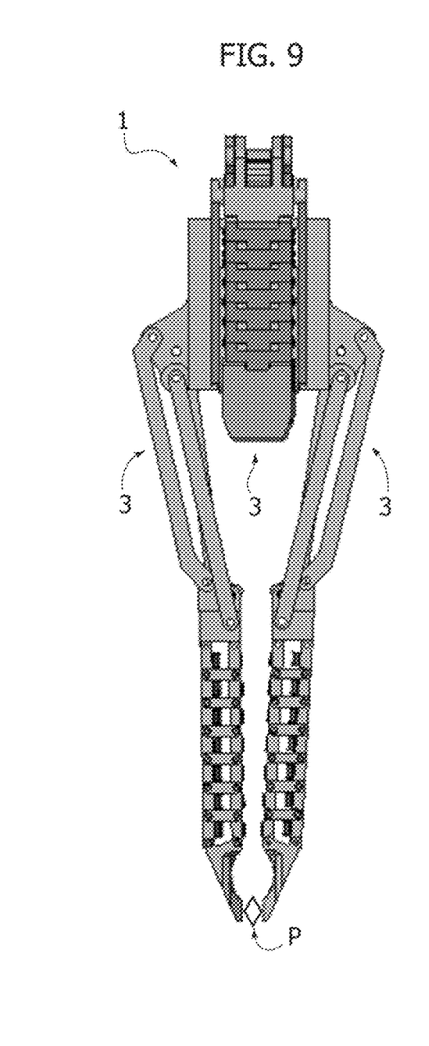
FIGS. 9-14 are views showing the use of the gripping device of FIG. 7 with items of different sizes and shapes.
Figure 10:
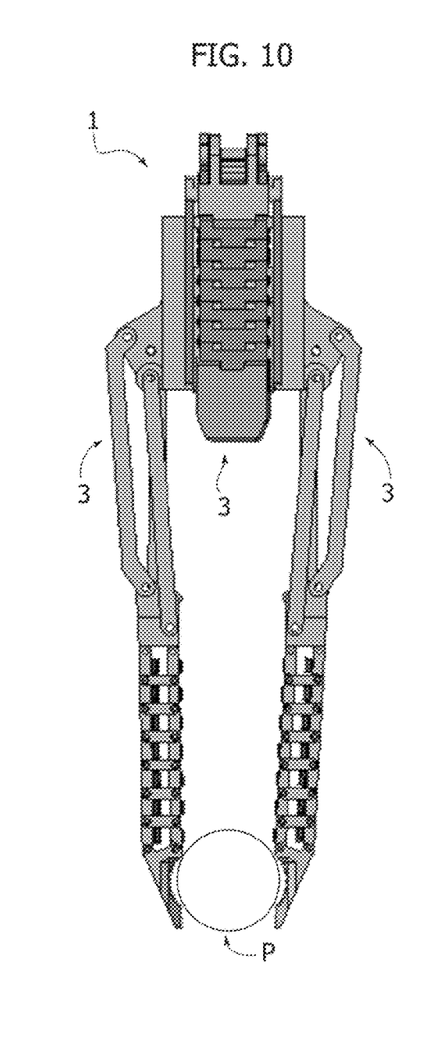
Figure 11:
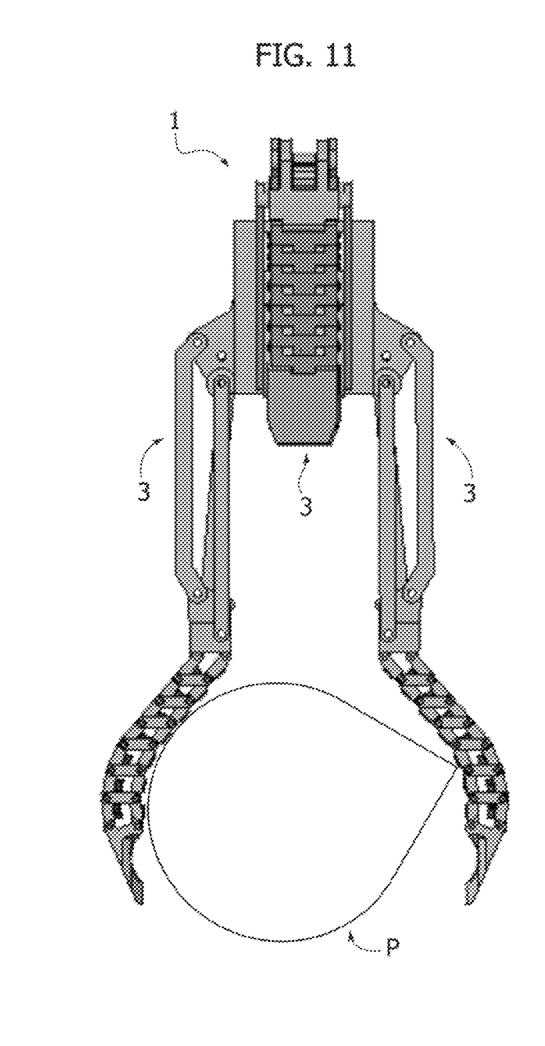
Figure 12:
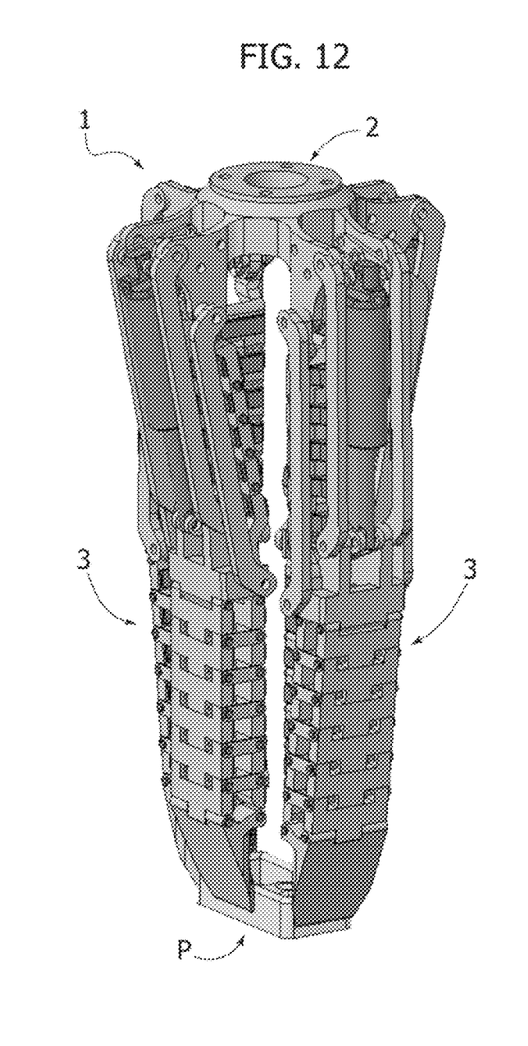
Figure 13:
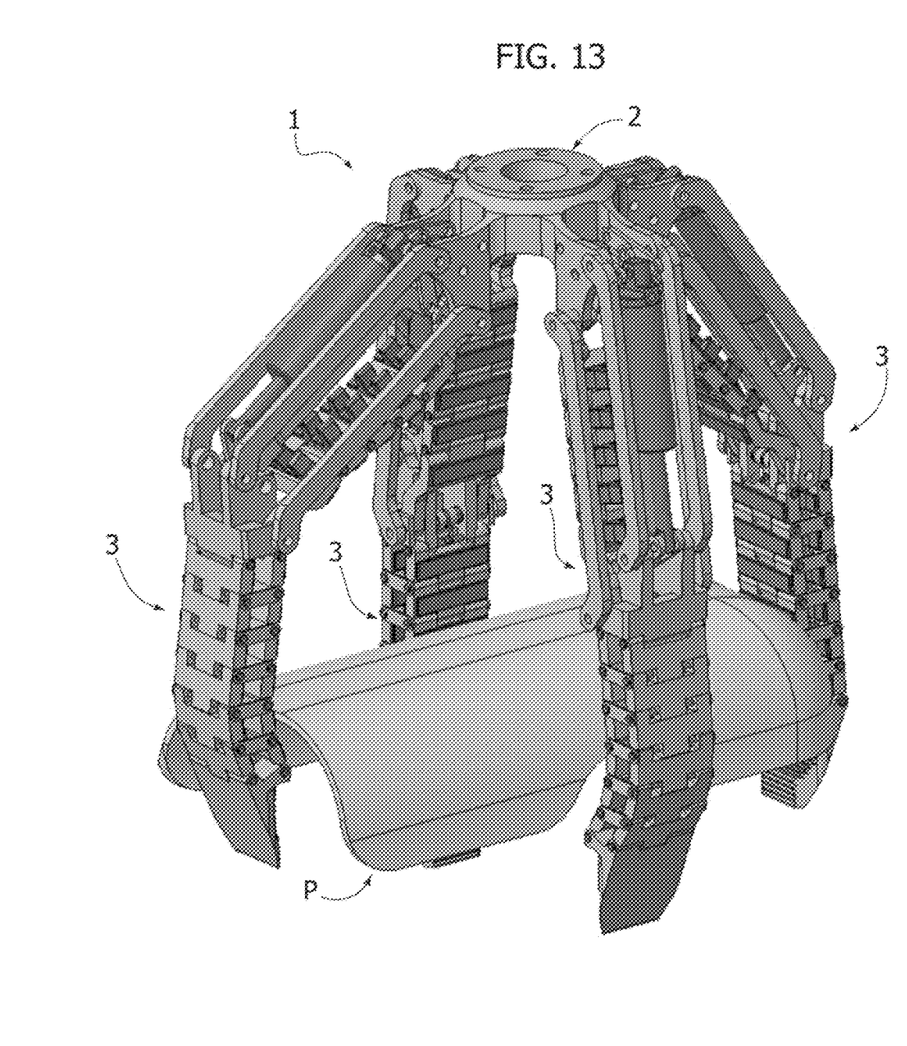

As can be seen in particular in FIGS. 9 and 10, the device 1 according to the invention is able to arrange the arms 3, even before gripping the item, in a close conformation, which facilitates the penetration of the device 1 into item-holder containers, for example, for collecting items left on the bottom of the container.

As is clear from the above description, the gripping device according to the invention is characterized in that it has a high operating flexibility, which allows it to operate with items and components of even widely different shapes and sizes. Furthermore, thanks to its conformation, the device is able to operate with total safety even in environments where operators are present.

Naturally, without prejudice to the principle of the invention, the details of construction and the embodiments may vary widely with respect to those described and illustrated purely by way of example, without departing from the scope of the present invention, as defined by the attached claims.

For example, the support structure 2 may have any different configuration instead of the annular plate configuration illustrated in the attached drawings. The kinematic mechanism that connects each actuator cylinder 4 to the portion 3A of each gripping arm 3 can also be of any type capable of transforming a variation in length of the actuator cylinder 4 into an oscillation of the portion 3A with respect to the support structure 2. As also clearly inferable from the above description, the construction details of the inner yielding panel 7, the back member 310 and the auxiliary inner panel 314 can widely vary with respect to the illustrated examples.

What is claimed is:

1. Gripping device, usable on a robot, for handling items or components of variable shape and size, said device comprising:
    a support structure,
    a plurality of gripping arms, each including a first proximal arm portion pivotally connected to the support structure and at least one second distal arm portion connected to the first proximal arm portion,
    a plurality of actuator devices carried by the support structure and each associated with a respective gripping arm, for commanding an articulation movement of said first proximal arm portion with respect to the support structure,
    at least one tendon associated with each gripping arm and having a first and a second head end secured to the first proximal arm portion and to the second distal arm portion respectively,
    each tendon of the at least one tendon being guided in a freely slidable manner along said first and second arm portions through a succession of guiding elements associated with said first and second arm portions,
    wherein the guiding elements associated with the first proximal arm portion are carried by an inner yielding panel arranged on an inner side of said first arm portion, which faces the item or component to be gripped,
    so that when the inner yielding panel on the inner side of the first proximal arm portion engages against an item or component to be gripped following a command given by the respective actuator device, the guiding elements of the at least one tendon carried by the inner yielding panel causes a tensioning of the at least one tendon which results in an articulation and/or inflection movement of said second distal arm portion with respect to the first proximal arm portion,
    so that each gripping arm is able to automatically adapt to the configuration of the item or component to be gripped, independently of the other gripping arms.

2. Device according to claim 1, wherein the inner yielding panel comprises a first surface facing the item or component to be gripped and a second surface, opposite the first surface, on which the guiding elements are carried.

3. Device according to claim 2, wherein two tendons of the at least one tendon substantially parallel to each other are associated with each gripping arm, and wherein said two tendons are guided in a freely slidable manner through a succession of holes formed through said guiding elements.

4. Device according to claim 1, wherein the second distal portion of each arm comprises a back member in the form of a chain of mutually articulated elements, on which the guiding elements that are associated with the second distal arm portion are carried, and an inner element, facing the item or component to be gripped, and wherein the inner element comprises a flexible auxiliary panel, having a first end and a second end, kept substantially parallel and distanced with respect to the back member by a plurality of connecting elements.

5. Device according to claim 4, wherein each gripping arm also comprises a third distal portion, connected to the second distal portion,
    and wherein the second end of the inner element is connected to said third distal portion,
    so that the aforesaid tensioning condition of the tendon also results into an articulation and/or inflection movement of the third distal arm portion with respect to the second distal arm portion, so as to further improve the adaptation of each gripping arm to the item or component to be gripped.

6. Device according to claim 1, wherein the second distal portion of each arm comprises a back member in the form of a first chain of mutually articulated elements, on which the guiding elements, and an inner element, facing the item or component to be gripped are carried, and wherein the inner element is in the form of a second chain of mutually articulated elements, having a first end and a second end, kept substantially parallel and distanced with respect to the back member by a plurality of connecting elements.

7. Device according to claim 1, wherein the first proximal arm portion has an articulated quadrilateral configuration defined by two pairs of arms each articulated at one end to said support structure and at an opposite end to an intermediate connecting member between the first proximal arm portion and the second distal arm portion, and
    wherein the actuator device associated with each gripping arm is a fluid actuator cylinder having opposite cylinder ends connected, respectively, to the support structure and to said intermediate member by means of connecting kinematic mechanisms, configured so that a variation in length of the actuator cylinder produces an oscillation of the first proximal arm portion with respect to said support structure.

8. Device according to claim 7, wherein the inner yielding panel of the first proximal arm portion has one end connected to said intermediate member and the opposite end free.

9. Device according to claim 7, wherein the inner yielding panel has one end connected to said intermediate member and the opposite end connected, directly or indirectly, to said support structure.

10. Device according to claim 7, wherein the first end of said inner element of the second distal arm portion is connected to said intermediate member.

11. Device according to claim 1, wherein the inner yielding panel of the first proximal portion of each gripping arm is in the form of a flexible panel or of a chain of mutually articulated elements.

* * * * *